United States Patent [19]

Corato et al.

[11] Patent Number: 4,738,753
[45] Date of Patent: Apr. 19, 1988

[54] METHOD OF PRODUCING CARBONACEOUS BODIES

[75] Inventors: Renzo Corato, Mestre; Giulio Ganapini, Genoa; Hans-Anton Meier, Milan; Mauro Poggi, Genoa; Antonio Rosso, Venice; Sergio Sanchioni, Mestre, all of Italy

[73] Assignees: Alusuisse Italia S.p.A, Milan; Italimpianti Societa Italiana Impianti p.A., Genoa; Sirma S.p.A., Malcontenta, all of Italy

[21] Appl. No.: 778,644

[22] Filed: Sep. 23, 1985

[30] Foreign Application Priority Data

Sep. 28, 1984 [IT] Italy .............................. 22916 A/84

[51] Int. Cl.⁴ ..................... C01B 31/00; C10B 47/46; C10B 57/00
[52] U.S. Cl. ....................................... 201/17; 201/32; 264/29.5; 264/29.7; 423/449; 423/461
[58] Field of Search .............. 201/5, 6, 10, 17, 23, 201/25, 32, 35, 37, 40, 43, 44; 423/448, 449, 460, 461, 445; 264/29.5, 29.7, 29.1

[56] References Cited

U.S. PATENT DOCUMENTS

| | | | |
|---|---|---|---|
| 2,247,185 | 6/1941 | Caccioppoli | 201/32 |
| 3,009,863 | 11/1961 | Angevine | 201/32 |
| 3,370,113 | 2/1968 | Goeddel | 264/29.7 |
| 3,663,186 | 5/1972 | Dzhaparidze et al. | 201/6 |
| 4,185,055 | 1/1980 | Barrilon et al. | 264/29.5 |
| 4,208,307 | 6/1980 | Lutz | 201/17 |
| 4,412,841 | 11/1983 | Du Broff et al. | 201/17 |

FOREIGN PATENT DOCUMENTS

| | | | |
|---|---|---|---|
| 103130 | 3/1984 | European Pat. Off. | |
| 118232 | 9/1984 | European Pat. Off. | 264/29.1 |
| 154713 | 9/1985 | European Pat. Off. | 264/29.5 |
| 1923767 | 11/1970 | Fed. Rep. of Germany | 264/29.1 |

Primary Examiner—Barry S. Richman
Assistant Examiner—Joye L. Woodard
Attorney, Agent, or Firm—Guido Modiano; Albert Josif

[57] ABSTRACT

The method employs a furnace, wherein organic distillation products released from the binder and the gaseous and particulate decomposition products are burned off. Bodies, placed on the ceramic bottom plate of a truck, are introduced into the pre-heating zone of the furnace, covered with protective coverings, and heated to 200°–600° C. in an oxidizing medium. Thereafter, the coverings are removed in a vestibule, in an inert or slightly reducing medium, and the bodies are introduced into the calcining zone, provided with an inert or slightly reducing medium, to be further heated up to a temperature in the 1000° to 1200° C. range. Lastly, the bodies are cooled in a first cooling zone down to 400°–450° C. in an inert or slightly reducing medium, and in a second zone down to room temperature.

11 Claims, 3 Drawing Sheets

METHOD OF PRODUCING CARBONACEOUS BODIES

BACKGROUND OF THE INVENTION

The invention relates to a method of producing carbonaceous bodies, in particular electrodes of parallelepipedal, cubic, or cylindrical shape, such as, for example, electrodes for the production of aluminum or steel, by calcining raw shaped bodies containing pyrolyzable substances, in a tunnel type furnace, wherein the volatile organic distillation products released from the binder after the pre-heating zone in the temperature range of 200° to 600° C. and the gaseous or particulate decomposition products are completely burned off.

The raw shaped bodies, also referred to as the carbonaceous bodies, are generally formed from a mass of petroleum coke, anthracite, carbon black, graphite, or the like, additivated with a binder, such as tar and/or pitch. In the combustion of such shaped bodies, the binder is cokefied to provide desired electrical and mechanical properties.

The description that follows will be given with specific reference to the process for the obtainment of electrodes useful in the production of aluminum, it being understood that the same method, with some appropriate modifications, may also be applied to the obtainment of electrodes for steel production.

Known are methods for the obtainment of electrodes for the production of alumium wherein the electrodes are calcined on an industrial scale in annular open chamber furnaces or in tunnel type furnaces. Tunnel type furnaces, such as disclosed for example in published patent DE-OS No. 30.42.708 or in EP-OS No. 0.103.130, afford the following distinctive advantages:
high reproducibility of the calcining conditions;
improved hygiene of the working area; and
efficient thermal recovery.

Tunnel type furnaces for aluminum production anodes comprise in principal four zones: a pre-heating zone (up to a temperature of the carbonaceous bodies of about 200° C.), a combustion zone (up to a temperature of the carbonaceous bodies of about 600° C.), a firing or calcining zone (up to a temperature of the carbonaceous bodies of about 1000°-1200° C.), and a cooling zone.

In the calcining process with tunnel type furnaces, a series of trucks, as previously loaded with raw carbonaceous bodies are pushed in, with the truck speed in the range of 0.5 to 3 meters per hour. The shaped bodies are preferably embedded in a powder filler containing carbon for protection against oxidation and deformation, and placed into muffles carried on the trucks.

The trucks are pushed through the furnace in accordance with a preset temperature pattern, also referred to as the firing curve. The temperature pattern, respectively the heating rate resulting therefrom, is a determining process parameter in the production of high quality fired electrodes. Once the firing curve of the tunnel type furnace is set, all the carbonaceous bodies are calcined in the same way, which affords a high degree of reproducibility. The trucks pushed through the tunnel type furnace have for example a loading surface of 5×4 meters, and one or more layers of the carbonaceous bodies may be laid onto a truck.

Calcining carbonaceous bodies in tunnel type furnaces has posed a problem which is but marginal or not encountered at all with annular chamber furnaces: the formation of cracks. This is to be attributed to physical and chemical changes undergone by the binders during calcination.

As mentioned above, carbonaceous bodies to be calcined are immersed in a powder filler containing carbon, usually in a box of a ceramic material which can withstand the high firing temperature. This is on the one side expensive from the standpoint of capital cost, and on the other side lowers the thermal efficiency of the tunnel type furnace because the carbon-containing powder filler acts simultaneously as a heat insulator.

SUMMARY OF THE INVENTION

In view of the above situation, the inventors have set for themselves the task of providing a method of producing carbonaceous bodies in a tunnel type furnace, which affords, for a low capital cost, results which are just as good as or even better than those afforded by prior methods.

This task is accomplished by a method of producing carbonaceous bodies, in particular electrodes such as anodes of parallelepipedal, cubic, or cylindrical shape, for the production of aluminum or steel, by calcining raw shaped bodies containing pyrolyzable substances in a tunnel type furnace, wherein the distillation volatile organic products released from the binder after the pre-heating zone at a temperature in the range of 200° to 600° C. and the gaseous and particulate decomposition products are completely burned off, characterized in that the carbonaceous bodies laid onto the bottom ceramic plate of a truck, in their travel through the tunnel type furnace are subjected to the following process steps in the same order as listed herein below:

heating the carbonaceous bodies in a pre-heating zone and a combustion zone, from room temperature up to 600°-700° C., and at the latest from 200° C. up in an oxidizing medium, all the carbonaceous bodies being covered with protective coverings comprising a heat-resistant material and extending over at least one carbonaceous body;

removing the protective coverings located on the sides and top surfaces of the carbonaceous bodies in a vestibule containing an inert or slightly reducing medium wherein the carbonaceous bodies are not cooled, and returning the protective coverings to cover the raw carbonaceous bodies being admitted into the pre-heating zones;

heating the carbonaceous bodies from 600°-700° C. up to a temperature in the range of 1000° to 1200° C., in an inert or slightly reducing medium, while moving through the firing zone, whereby the carbonaceous bodies are calcined;

cooling the carbonaceous bodies, in an inert or slightly reducing medium, in a first cooling zone down to at least 400°-450° C.; and cooling the carbonaceous bodies down to room temperature in a second cooling zone.

In the combustion zone, which is operated at a temperature range of 200° C. to 600°-650° C., the volatile organics released from the binder are to be burned off completely. In this case, therefore, an oxidizing medium or atmosphere becomes necessary, and hence, an antioxidation protection for the carbonaceous bodies.

With divided cooling zones, air may be used as a coolant since upon the temperature dropping to about 400°-450° C., no risk of ignition exists and the carbonaceous bodies are cooled down to room temperature. Where air is used for cooling, that zone must be separated from the preceding one by a vestibule to prevent flow of gases from one zone to the other. The carbonaceous bodies are suitably heated up to about 200° C. at a maximum temperature gradient of 10° C. per hour, preferably of 4° to 6° C./hour, and then at a maximum temperature gradient of 50° C. per hour, preferably 20° to 30° C./hour.

As mentioned above, calcination of carbonaceous bodies in tunnel type furnaces has posed a problem which is marginal or absent with annular chamber furnaces, namely the formation of cracks. Such cracking is attributable to physical and chemical changes undergone by the binders during calcination.

Advantageously, an evenly distributed weight of at least 70 kgw/m$^2$, in particular of 100–280 kgw/m$^2$, is arranged, therefore, to act on the surface(s) of the carbonaceous bodies at least until the binder within the carbonaceous bodies has completely softened. This weight is provided by plate weights of a fire- and corrosion-resistant ceramic material, a pour of a carbon-containing powder filler and/or lightweight covering plates effective to protect the powder filler.

For economical and process reasons, air is mainly used as an oxidizing medium, and nitrogen as an inert medium.

An inert medium or atmosphere comprising, for example, nitrogen and $CO_2$ may be generated, for example, by the partial combustion of methane and air, followed by decomposition of the CO present in the $CO_2$ on catalysts. As a slightly reducing medium, satisfactory results have yielded for example mixtures of $CO_2$ and/or CO and/or $H_2$ with $N_2$.

The inert or slightly reducing medium is expediently flown in counter-current relationship through the first cooling zone, firing zone and/or vestibule, and preferably, it is recirculated by means of a conventional cooling device. Furthermore, the inert or slightly reducing gas issuing from the first cooling zone and/or vestibule may be utilized at least in part to heat the combustion air for the pre-heating and combustion zones. This is accomplished, in a manner well understood by the skilled artisan, through appropriate heat exchanger.

In order to ensure complete removal of the volatile organic gases issuing from the binders from the combustion zone, it is expedient that an oxygen content of at least 2% by volume and a temperature of at least 550° C. be maintained. For the combustion of these distillation products, it is common practice in the industry to convey, for convenience, air into the combustion zone maintained at the desired temperature.

The removable plates or protective coverings, as required to protect the carbonaceous bodies in the combustion zone, are applied in practice mainly in two forms:

a casing or jacket of a heat-resisting and gas-impervious steel, fashioned to fit the geometry of the loading zone and placed on the sides of the carbonaceous body or bodies.

The steel casing is equipped, at the top portion thereof, with a gas-pervious and corrosion-resistant surface member, such as a metal grid or a plate of a porous ceramic. A layer of a carbon-containing powder filler is poured onto it, in particular one comprising metallurgic coke or petroleum coke. Thus, oxidizing attack of the raw carbonaceous bodies to be calcined is prevented.

However, the distillation products are allowed to escape through the metal grid, respectively the ceramics plate and powder filler, and can be burned off in the combustion zone. The metal grid, which should remain stable as a ceramic porous layer up to 700° C., is expediently made of steel, and specifically in the form of a steel plate having smaller perforations than the granules of the powder filler.

Alternatively, the protective covering is a steel box open at the bottom and corresponding with the geometry of the carbonaceous body or bodies, arranged to cover their sides and top surface areas. Since such steel boxes would not be pervious to gases, the base refractory plates that form the loading surface of the truck and that form the bottom wall of the enclosure also comprising the protective covering, require to be porous. Thus, the escaping distillation products can flow out through these plates and be burned in the combustion zone.

The protective coverings would be removed in the vestibule, in both of the embodiments just described, thereby the carbonaceous bodies enter in a bare or exposed condition the successive firing or calcining and cooling zones. The weight disposed as previously explained would also be expediently removed, of preference, in the vestibule.

The protective covering, along with the metal grid, or respectively, the ceramics plate, the powder filler, and lightweight covering plates, is brought back to the inlet to the pre-heating zone, and is utilized to cover the raw carbonaceous bodies newly fed for a new calcining cycle.

According to an advantageous improved embodiment of this invention, on the edge of truck loading platform there may be formed a groove which extends all around. The bottom edge of the side walls of the protective coverings would be positioned in this groove, which is part-filled with a sealing and/or filtering material. As the sealing, respectively filtering, materials, sand or a carbon-containing granulate may be used. This seal ensures that no oxygen can enter across the rest surface of the protective covering and attack the raw carbonaceous bodies.

BRIEF DESCRIPTION OF THE DRAWINGS

The invention will be next explained in a detailed manner with reference to embodiments thereof illustrated in the accompanying schematic drawing, where.

DESCRIPTION OF THE PREFERRED EMBODIMENTS

Figure 1:
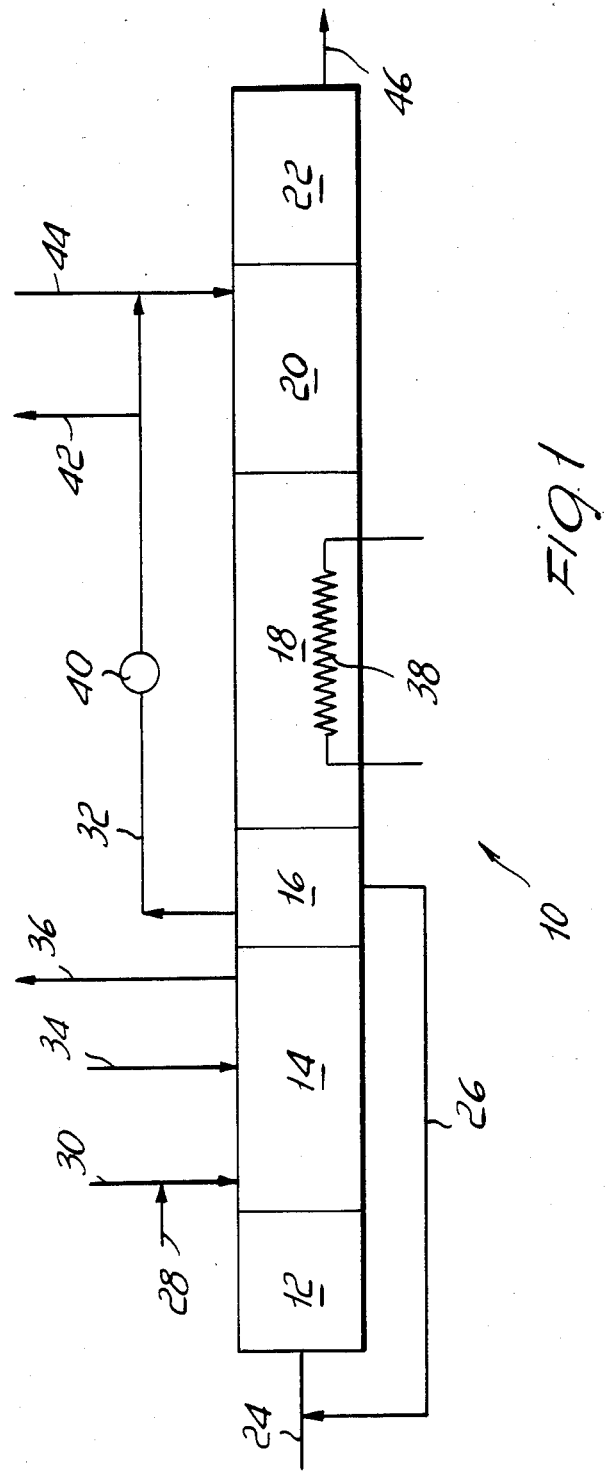
FIG. 1 is a diagram illustrating the layout of a tunnel type furnace.

The layout of a tunnel type furnace 10 shown diagrammatically in FIG. 1 brings out its different separate zones, namely: a pre-heating zone 12, combustion heating zone 14, vestibule 16, firing zone 18, first cooling zone 20, and second cooling zone 22. In the diagram, all the zones of the tunnel type furnace are shown as laid out along a line. However, the tunnel type furnace may also be implemented in a ring or spiral form. The trucks, loaded with the carbonaceous bodies, may be pushed through the whole furnace along a rail. In modified embodiments not shown, the individual zones of the tunnel type furnace may be laid out separately, and especially so the pre-heating 12 and second cooling zone 22.

Raw carbonaceous bodies are introduced at 24 into the pre-heating zone 12. They have been previously covered with a protective covering which is returned out of the vestibule 16 over a re-circulation runway 26.

The combustion heating zone 14, and possibly the pre-heating zone 12 as well, are heated by the admission of air 28 and a gaseous fuel 30. Several materials may be used for the gaseous fuel, such as methane or butane. By using a slightly reducing gas in the next zones of the tunnel type furnace, some of this reducing gas may be tapped out and burned in the pre-heating zone, respectively the combustion zone. As a further alternative, at least some of the slightly reducing or inert gas 32 flowing out of the vestibule 16 at a temperature of 700°-900° C., may be cycled back through heat exchangers which would pre-heat one component for the pre-heating zone and the combustion heating zone to heat these zones to the required temperature.

Furthermore, the combustion heating zone 14 is supplied with the air required for the combustion of the distillation products through a supply line 34. The combustion gases (from the zone 14) which no longer contain hazardous substances, are exhausted through a duct for the flue gases, 36.

The firing or calcination zone 18, wherein the requisite high temperatures for calcining the carbonaceous bodies are reached, is heated by radiating tubes 38 of conventional construction. These radiating tubes are sealed to the tunnel type furnace and radiate to the interior the heat obtained by air/gas combustion in a burner placed inside them. It would also be possible to use stoichiometric feed air burners or electrical resistance heaters.

In the first cooling zone 20, the fired carbonaceous bodies are cooled in an inert or slightly reducing medium until they can no longer ignite on contact with air.

The inert or slightly reducing gases are made to flow counter-currently over the carbonaceous bodies in the first cooling zone 20, firing or calcining zone 18, and vestibule 16, and are recirculated over a duct 32, respectively utilized at least in part for pre-heating the combustion air required by the pre-heating and combustion heating zones. In recirculating, the inert, respectively mildly reducing, gases are caused to flow through a cooler 40, which is in practice a heat exchanger. It will be understood that the counter-current flow entering vestibule 16 as above mentioned, prevents flow of gase from combustion heating zone into the calcining zones.

Since the carbonaceous bodies are liable to release, even above 600°-650° C., i.e. in the firing zone, gaseous substances in the form of cracking products, some of the recycled inert or mildly reducing gas is again picked up through piping 42 including an exhaust valve not shown, and conveyed to a purifying system or as secondary fuel to the oxidizing zones. The cracking products formed are light hydrocarbons such as methane and hydrogen.

The gases tapped off are replaced with fresh inert, respectively mildly reducing, gas through a duct 44.

Lastly, in the second cooling zone 22 the carbonaceous bodies are again allowed to contact, by forced circulation of air, an oxidizing medium if a vestibule is provided between the two cooling zones. It will be understood that such vestibule prevents flow of gases between the two cooling zones. The temperature of the carbonaceous bodies is now so low that carbon can no longer burn. The trucks with the thoroughly fired carbonaceous bodies are pushed out of the tunnel type furnace in the direction 46, unloaded, and then forwarded to a new firing cycle.

Figure 2:
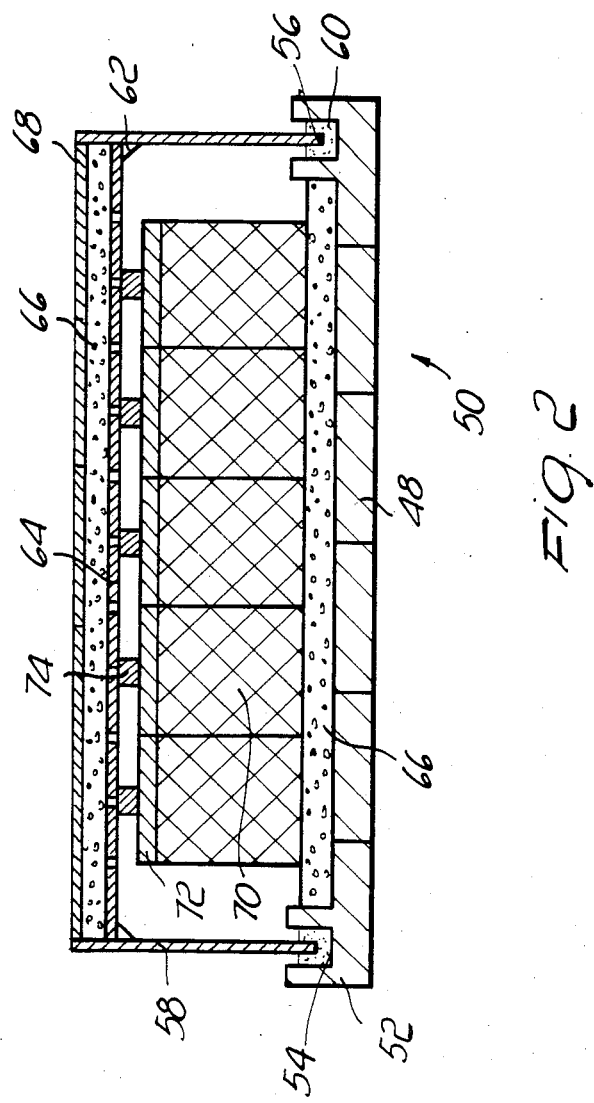
FIG. 2 is a vertical section through carbonaceous bodies placed on the loading platform with the pervious protective covering on top.

The top portion, shown in FIG. 2, of a truck for tunnel type furnace loading presents a loading surface 50 comprising a refractory bottom plate 48. On the edge 52 of the loading surface or platform, there is formed a groove 54 extending all around it, in which the bottom edge 56 of the side walls of the protective covering 58 engages. The groove 54 is filled with a sealing material 60, which prevents oxidizing medium from entering. The gas-impervious side walls of the protective covering 58 are provided at the top with supporting ring 62 on which the metal grid 64, in the form of a perforated steel plate, is made to rest. Over this perforated steel plate, there is laid a layer of powder filler, 66, which is protected, in turn, by lightweight covering plates 68.

The loading platform 50 is covered with a layer of powder filler 66 of metallurgical coke. This layer functions, on the one side, to provide an even rest surface for the blocks of carbonaceous bodies 70, and on the other side, to make the oxidizing medium entering the bottom plates through cracks or pores harmless.

Directly on the carbonaceous bodies 70, in this case anodes for the electrolysis of alumina, there are laid the plate weights 72 which, through metal supports 74, can support the metal grid 64 self-supporting per se. As visible from FIGS. 2 and 3 of the drawing the carbonaceous bodies are spaced apart from the side walls and top wall of the protective covering 58, the positioning of which is adjusted accordingly during the covering operation of the carbonaceous bodies.

Figure 3:
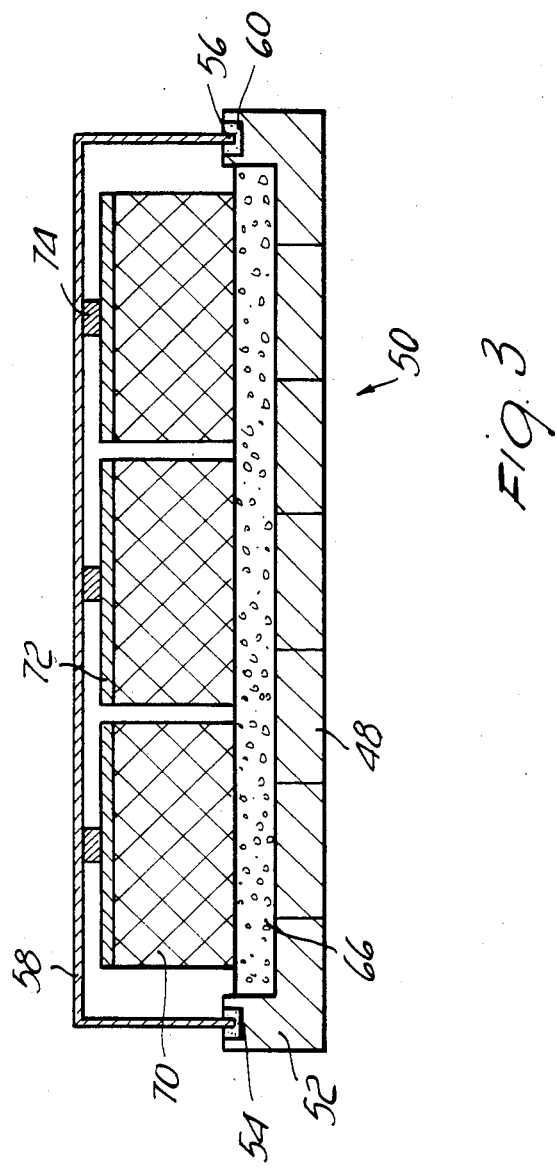
FIG. 3 is a vertical section through an arrangement of carbonaceous bodies placed on a loading platform and being covered with an open-bottom steel box which is impervious to gases, as the protective coverings.

FIG. 3 differs from FIG. 2 essentially by the fact that the removable protective covering 58 comprises an open-bottom steel box having a gas-pervious bottom wall consisting of the loading platform 50. The distillation products which escape from the combustion zone of the tunnel type furnace can only flow out now through the loading platform 50; accordingly, the latter must be made sufficiently porous. Owing to the oxidizing medium having a better chance of entering through the loading platform 50 and attacking the carbonaceous bodies 70, the layer comprising the powder filler 66 is made somewhat deeper than in FIG. 2.

In the two embodiments discussed hereinabove, the protective covering 58 is removed as one piece from the vestibule 16 and taken back to the inlet to the pre-heating zone of the furnace, as indicated by the arrow 26.

The inventive method affords the following advantages:

thanks to the inert or slightly reducing medium in the firing zone and cooling zones, the protective covering can be removed in a vestibule; thus, the protective covering is not to enter the high temperature firing zone and can be of a more inexpensive material; and the carbonaceous bodies can be calcined by the application of a minimal amount of heat, since they are introduced bare into the firing zone.

We claim:

1. A method for producing calcined carbonaceous bodies from shaped raw carbonaceous bodies containing a binder which upon heating undergoes softening and releases organic volatile compounds, the method comprising the steps of:

placing said shaped raw carbonaceous bodies on a loading platform of a truck, covering said shaped raw carbonaceous bodies with a removable protective reusable covering structure of heat resistant material having a top wall, side walls supporting said top wall and having bottom edges resting in use on said loading platform and delimiting therewith a bottom area on said platform defining with said side walls and said top wall an enclosure structure for said shaped raw carbonaceous bodies, said enclosure structure having at least one wall area made of gas-pervious material including a layer of antioxidant powder filler, adjusting the position of said covering structure on said loading platform so that the one wall area is in spaced relationship with at least a part of an outside surface area of said shaped raw carbonaceous bodies, moving said truck with thereon said enclosure structure and said shaped raw carbonaceous bodies enclosed therein through a tunnel type furnace having in succession a pre-heating zone, a combustion heating zone, an intermediate vestibule zone, a calcining zone and at least one cooling zone, providing in said pre-heating and said combustion heating zones combustion supporting gaseous media comprising at least in said combustion heating zone an oxygen content of at least 2% by volume and maintaining said combustion heating zone at a temperature of at least 550° C. whereby substantially all of said organic volatile compounds released in said combustion heating zone by said shaped raw carbonaceous bodies are combusted during passage therethrough of said truck with said enclosure structure, moving said truck further through said intermediate vestibule zone while preventing gas flow from said combustion heating zone into said calcining zone through said intermediate vestibule zone, removing said covering structure in said intermediate vestibule zone from said heated shaped raw carbonaceous bodies to expose the surfaces of said heated shaped raw carbonaceous bodies and further moving said truck with the exposed heated carbonaceous bodies thereon through said calcining zone and through said at least one cooling zone while supplying non oxidizing gaseous media to said intermediate vestibule zone, said calcining zone and said at least one cooling zone.

2. A method according to claim 1 wherein said top wall is made of said gas-pervious material.

3. A method according to claim 1 wherein said bottom area is made of said gas-pervious material.

4. A method according to claim 1 wherein said step of adjusting the position of said covering structure on said loading platform comprises adjusting said position of all of said top and side walls of the protective covering is spaced apart relationship to said carbonaceous bodies.

5. A method according to claim 1 wheren said nonoxidizing gaseous media is selected from inert and slightly reducing gases including nitrogen, $CO_2$, CO, $H_2$ and mixtures thereof, and said non oxidizing gaseous media is supplied through said at least one cooling zone, said calcining and said intermediate vestibule zones countercurrently to the direction of movement of said carbonaceous bodies.

6. A method according to claim 5 wherein said nonoxidizing gaseous media is withdrawn from said intermediate vestibule zone and recirculated to said at least one cooling zone through a heat exchanger.

7. A method according to claim 1 further comprising heating said carbonaceous bodies in said preheating zone up to about 200° C. at a maximum heating rate of 10° C. per hour, heating said carbonaceous bodies in said combustion heating zone up to 600°–700° C. at heating rate of up to 50° C. per hour, heating said carbonaceous bodies in said calcining zone up to 1000°–1200° C., and cooling zone down to at least 400°–450° C.

8. A method according to claim 1 wherein said at least one cooling zone includes two cooling zones in succession, cooling said exposed heated carbonaceous bodies to at least 400°–450° C. in a first cooling zone and further cooling said exposed carbonaceous bodies in a second cooling zone with an oxygen containing gaseous media while preventing gas flow between said first and said second cooling zones.

9. A method according to claim 1 further comprising the step of recirculating said protective covering removed in said intermediate vestibule zone for covering fresh shaped raw carbonaceous materials fed to said furnace.

10. A method according to claim 1 further comprising applying an evenly distributed weight of at least 70 kgw/m$^2$ on said carbonaceous bodies during passage through said pre-heating zone and said combustion heating zone where said binder has undergone a complete softening.

11. A method for producing calcined carbonaceous bodies from shaped raw carbonaceous bodies containing a binder which upon heating undergoes softening and releases organic volatile compounds, the method comprising the steps of:

placing said shaped raw carbonaceous bodies on a loading platform of a truck, covering said shaped raw carbonaceous bodies with a removable protective reusable covering structure of heat resistant material having a top wall, side walls supporting said top wall and having bottom edges resting in use on said loading platform and delimiting therewith a bottom area on said platform defining with said side walls and said top wall an enclosure structure for said shaped raw carbonaceous bodies, said enclosure structure having at least one wall area made of gas-pervious material including a layer of antioxidant powder filler, adjusting the position of said covering structure on said loading platform so that the one wall area is in spaced relationship with at least a part of an outside surface area of said shaped raw carbonaceous bodies, moving said truck with thereon said enclosure structure and said shaped raw carbonaceous bodies enclosed therein through a tunnel type furnace having in succession a pre-heating zone, a combustion heating zone, an intermediate vestibule zone, a calcining zone, a first cooling zone and a second cooling zone, and heating in said preheating zone said shaped raw carbonaceous bodies up to about 200° C. at a maximum heating rate of 10 C. per hour, further heating in said combustion heating zone said pre-heated shaped raw carbonaceous bodies up to a temperature in the range of 600°–700° C. at a heating rate of up to 50° C. per hour while supplying said pre-heating and said combustion heating zones with combustion supporting gaseous media comprising at least in said combustion heating zone an oxygen content of at least 2% by volume and maintaining in said combustion heating zone said temperature range whereby substantially all said organic volatile compounds released in said combustion heating zone by said shaped raw carbonaceous bodies are combusted during passage therethrough of said truck with thereon said enclosure structure, while moving said truck through said intermediate vestibule zone, preventing gas flow from said combustion heating zone into said calcining zone through said intermediate vestibule zone, removing said covering structure in said intermediate vestibule zone from said heated shaped raw carbonaceous bodies to expose the surfaces of said heated shaped raw carbonaceous bodies and recirculating said protective covering removed in said vestibule zone for covering fresh shaped raw carbonaceous materials fed to said furnace, while moving said truck with the exposed heated carbonaceous bodies thereon through said calcining zone, heating said carbonaceous bodies in said calcining zone up to 1000°-1200° C. to thereby obtain calcined carbonaceous bodies, while moving thereafter said truck with said calcined carbonaceous bodies thereon through said first cooling zone, cooling down therein said calcined carbonaceous bodies to at least 400°-450° C., and while moving further said truck with said cooled calcined carbonaceous bodies so cooled thereon through said second cooling zone and further cooling therein said calcined carbonaceous bodies while supplying said second cooling zone with oxygen containing media and preventing gas flow between said first and said second cooling zone.

* * * * *